United States Patent [19]

Hanse

[11] Patent Number: 5,594,177

[45] Date of Patent: Jan. 14, 1997

[54] SHAKER TABLE

[76] Inventor: John K. Hanse, 2745 - 136th Ave., Hopkins, Mich. 49328

[21] Appl. No.: 443,061

[22] Filed: May 17, 1995

[51] Int. Cl.⁶ .................................................. G01M 7/06
[52] U.S. Cl. ................................ 73/663; 73/665; 73/666
[58] Field of Search ........................... 73/663, 665, 666, 73/667, 668

[56] References Cited

U.S. PATENT DOCUMENTS

| 4,164,151 | 8/1979 | Nolan et al. | 73/663 |
| 5,412,991 | 5/1995 | Hobbs | 73/663 |

FOREIGN PATENT DOCUMENTS

| 2031160 | 4/1980 | United Kingdom | 73/663 |

Primary Examiner—John E. Chapman
Attorney, Agent, or Firm—Waters & Morse, P.C.

[57] ABSTRACT

A shaker table comprises upper and lower plates spaced apart by a plurality of spacers that fit between the plates. Each spacer has an upper shaft, which threads into a vibrator opening in the upper plate, and a lower coaxial shaft, which slides into a vibrator opening in the lower plate. The spacer has a threaded internal coaxial opening extending through the spacer. A bolt for securing a vibrator to the bottom of the table engages the internal opening and secures the vibrator and the lower plate to the spacer and upper plate. A mounting bolt for attaching a test product or test fixture to the top of the table threads into the internal opening from the top.

8 Claims, 3 Drawing Sheets

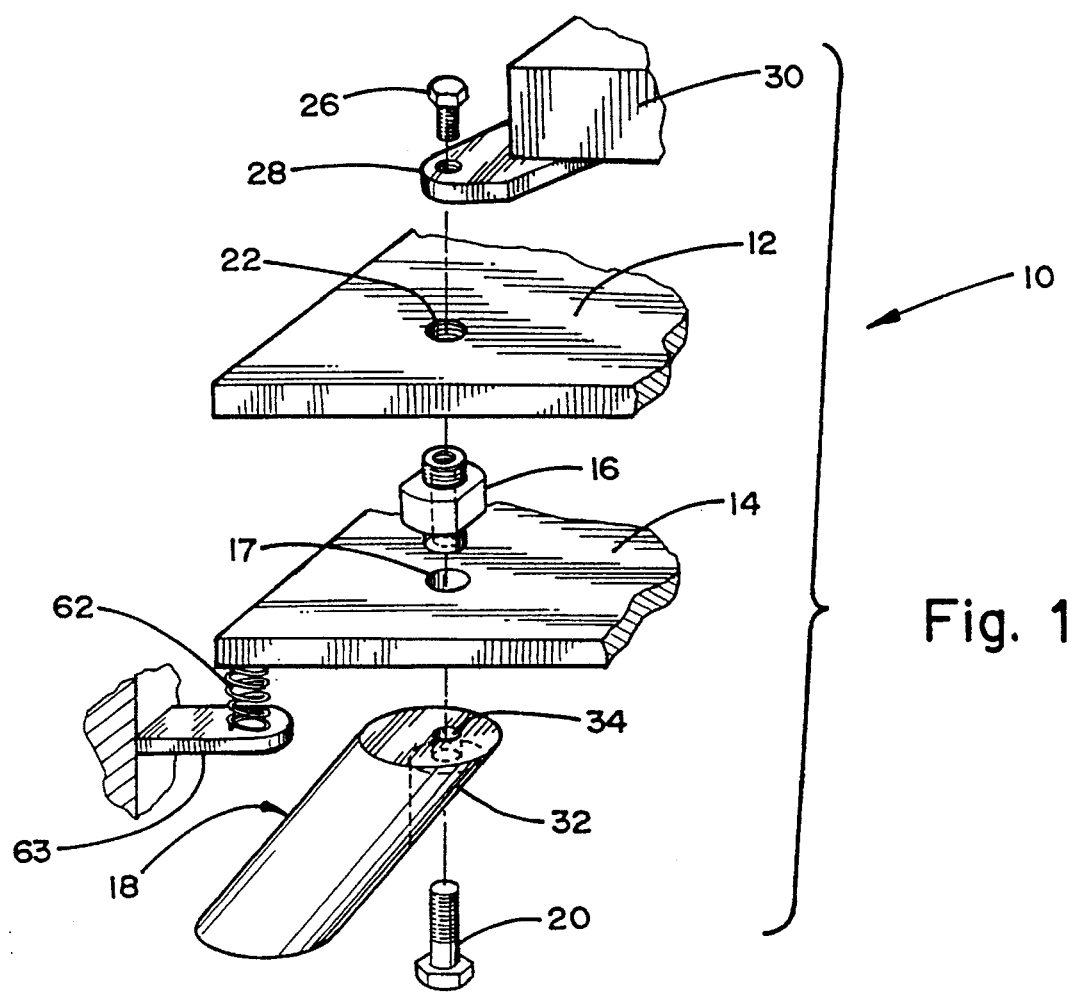
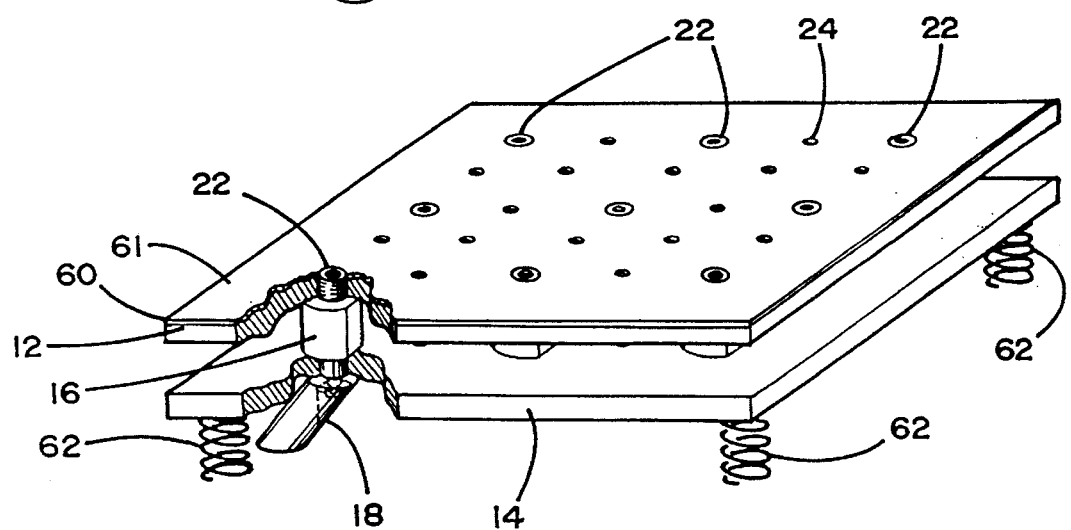

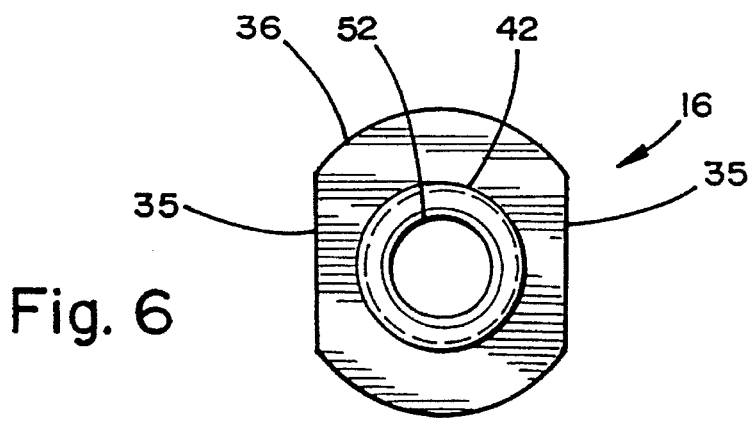
Fig. 6
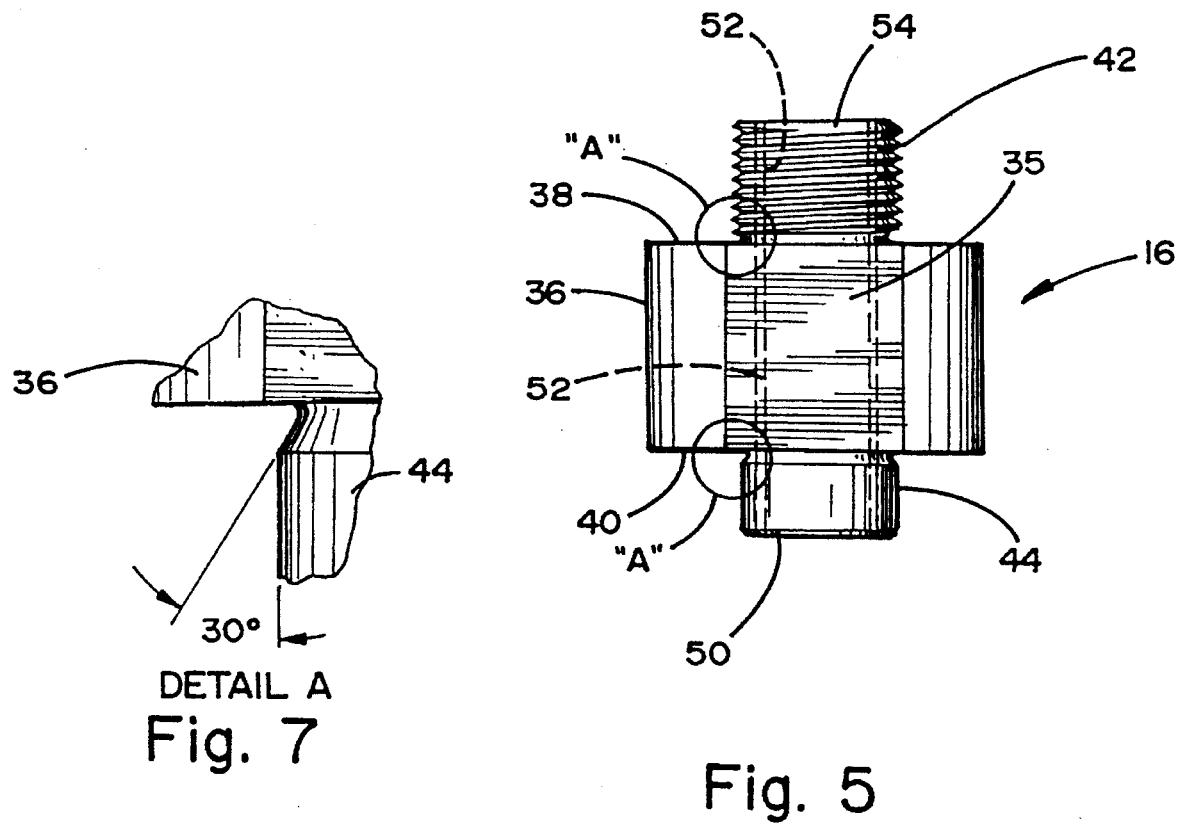
Fig. 7
Fig. 5

SHAKER TABLE

FIELD OF THE INVENTION

The present invention relates to a shaker table used for testing products.

BACKGROUND OF THE INVENTION

Shaker tables are vibration tables that are used for testing various products and components. The function of a shaker table in product testing is to vibrate a product under conditions that the product might see in use except at an exaggerated rate, so that accelerated testing for product failure is possible. One type of testing is product design testing, wherein a test product is cycled under highly stressed conditions until one of the components fails. This component is then improved and the product recycled until the next component fails. This procedure is continued until maximum product design integrity is achieved. Another type of testing is product integrity testing, wherein after the product has been designed and produced, production products are tested at a lower stress level to determine if there are any structural flaws introduced in the manufactured product. This level of testing involves lower stress levels than product design testing and is generally not intended to be destructive of properly manufactured products.

In conducting product testing with a shaker table, it is generally desired to create a test pattern that includes a range of vibration frequencies within a desired test spectrum and to make these vibrations relatively uniform in amplitude and relatively uniform over the entire surface of the table. It is further considered desirable to vibrate test products with random or quasi-random vibrations in different directions at the same time.

An object in designing a shaker table is to provide a table that transmits vibrator energy efficiently to the test product without the table being overly responsive to resonant frequencies in the test range. When a table vibrates excessively at a resonant frequency in the test range, the excessive table vibration can seriously impair the objectives of the test.

To minimize the effects of resonant frequencies in the test range, some early shaker tables were designed to be as rigid as possible. As the rigidity of a table increases, the lowest or fundamental resonant frequency or natural frequency of the table increases. By making the table as rigid as possible, it was hoped to provide a fundamental resonant frequency that would be higher than the frequency range of the test (often below 2,500 Hz.). In practice, such tables still tended to produce undesirable resonant frequencies in the desired test range with the vibrators used at the time. When a rigid table produces undesirably large vibration amplitudes at the resonant frequencies, this table is considered to be too "live".

Another problem with trying to avoid resonance problems by making the table extremely rigid is that such tables also tend to be very heavy. It is desirable to be able to vibrate products with maximum amplitude and intensity with vibrators that are as small and inexpensive as possible. A heavy table has considerable mass and in effect absorbs a good deal of the vibration energy imparted by the vibrators. Thus, in order to achieve a desired vibration amplitude or acceleration level (referred to as a "g" level) with a large, solid table, large vibrators are necessary. This performance goals may exceed the capacity of pneumatic vibrators.

In an attempt to overcome these problems, Scharton U.S. Pat. No. 3,686,927 proposed the use of a light, more flexible table having a core comprising a matrix of different shaped materials with different resonant frequencies, such that the table produces multiple resonant frequency vibrations that become diffused and attenuated over the frequency range.

Baker, et al. U.S. Pat. No. 4,735,089 discloses a shaker table comprising one or more layers of a honeycomb material mounted between a solid and a segmented plate and actuated by multiple pneumatic vibrators operating at variable frequencies. Elastomeric materials are used between layers in order to dampen or reduce amplitude spikes that might occur at resonant frequencies of the table. In order to dampen resonance spikes, this table tends to absorb more vibration energy than is desirable, hence limiting the maximum performance capabilities of the table or making it necessary to use larger vibrators in order to achieve a particular amplitude or intensity of vibration in the test product.

Other manufacturers have used tables formed from solid plates with voids machined in the plates in order to provide a lighter table and more responsive table while still providing tolerably low resonant frequency vibration spikes. In such tables, multiple vibrators operating in different directions and at varying frequencies have been used to achieve multi-axis random vibrations and to avoid undesirably high resonance peaks. These tables, however, can be expensive and sometimes have problems producing low frequency vibrations.

An object of the present invention is to provide an improved vibration table that can be manufactured at low cost; transmits a high proportion of the vibration energy to the test product; transmits low frequency vibrations; produces a relatively uniform amplitude over the desired frequency range; and produces relatively uniform vibration amplitude over the surface of the table.

SUMMARY OF THE INVENTION

In accordance with the present invention, a shaker table comprises an upper plate on which a test product is mounted, the upper plate having a plurality of vibrator mounting openings therein. A lower plate is spaced below the upper plate, the lower plate having a plurality of vibrator mounting openings therein that are aligned with vibrator mounting openings in the upper plate. A plurality of spacers are mounted between the plates, the spacers each having a central portion positioned between the plates, an upper shaft extending upwardly therefrom, and a lower shaft extending downwardly therefrom, the upper and lower shafts fitting respectively in the corresponding vibration mounting openings in the upper and lower plates. The central portion abuts the upper and lower plates so as to space the plates a predetermined distance apart. A threaded internal opening extends through the shafts and into the central portion. A fastener securely mounts the spacer to the upper plate. A fastener for mounting a vibrator to an underside of the lower plate extends through an opening in the vibrator and engages the threaded internal opening in the lower shaft, the fastener thereby serving to attach the lower plate and the vibrator to the spacer and the upper plate.

The resulting shaker table has good performance characteristics, is light and responsive, provides important low frequency vibration, and is relatively inexpensive to manufacture.

Additional features and advantages of the present invention are shown and described in connection with an exemplary embodiment of the present invention shown and described below.

BRIEF DESCRIPTION OF THE DRAWINGS

FIG. 1 is an exploded perspective view of a portion of a shaker table constructed in accordance with the present invention.

FIG. 2 is a perspective view of the assembled shaker table, shown schematically mounted on springs at the corners.

FIG. 5 is a side elevational view of a spacer in accordance with the present invention.

FIG. 6 is an axial end view of the spacer of the present invention.

FIG. 7 is an enlarged fragmentary side elevational view of a portion "A" of the spacer shown in FIG. 5.

DETAILED DESCRIPTION OF PREFERRED EMBODIMENT

Figure 3:
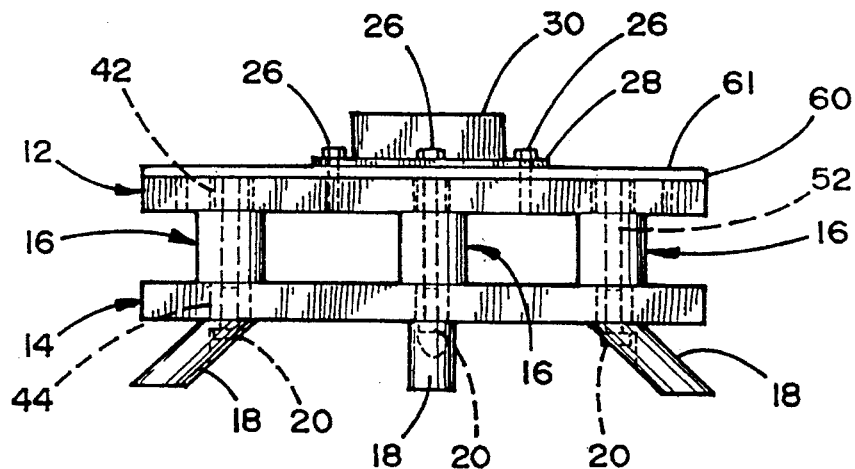
FIG. 3 is a side elevational view of the present invention.

Referring now to the drawings, a vibration table 10 constructed in accordance with the present invention comprises an upper plate 12 and a lower plate 14 spaced apart and connected together by spacers 16 positioned between the plates. Vibrators 18 are attached to the lower side of lower plate 14 by means of bolts 20 that thread into threaded internal openings 52 in the lower ends of spacers 16.

Figure 4:
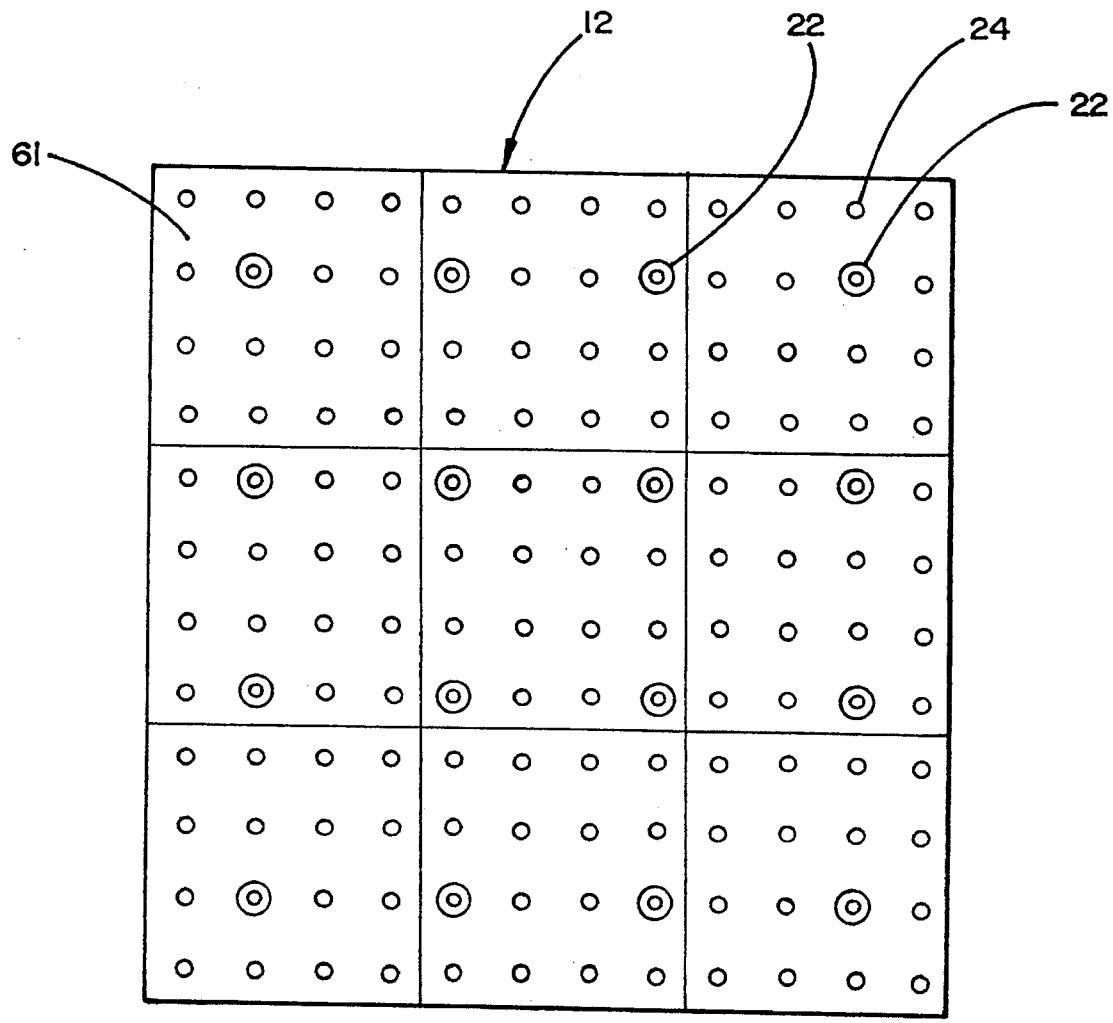
FIG. 4 is a top plan view of the present invention.

Plates 12 and 14 can be identical in shape and preferably are square, solid aluminum plates. Various sizes of tables can be used for different testing applications and for different sizes of table enclosures. A four foot square table is shown in FIG. 4 for exemplary purposes. This table employs a one-half inch aluminum plate for the upper and lower plates, and the plates are spaced apart by the spacers a distance of 1.25 inches.

As shown in FIGS. 2 and 4, the upper surface of plate 12 includes a plurality of vibration openings 22 therein at locations aligned with vibration openings 17 for vibrators 18 in the bottom of the table. In addition to openings 22, the top of the table can include a plurality of openings 24 for attaching a test product 30 or a test product mounting fixture 28 to the top of the table by bolts 26. With a typical vibration table, test product mounting fixture holes 24 are formed over the entire surface of the table at regular intervals which are somewhat standardized in the industry. A three or four foot table, for example, typically will have mounting fixture holes 24 formed in a rectangular pattern spaced at four inch intervals over the top of the table. These mounting holes are threaded and are adapted to receive bolts 26 which extend through a mounting fixture 28 and hold a product 30 to the top of the table.

Vibrators 18 are conventional and comprise pneumatic vibrators wherein pistons are reciprocally mounted in cylindrical chambers in skewed chamber housings 32. The chamber housings have openings 34 therethrough which receive bolts 20. The vibrators are spaced in a balanced pattern around the plate, with the individual vibrators being aimed in different directions. The pattern shown in FIG. 4 is the hole pattern for the vibrator holes and mounting holes that typically might be used in a four foot by four foot table. In the preferred practice of the present invention, the vibrators are mounted at forty-five degree angles on the bottom of the table and individual vibrators are aligned at different angles to provide multi-axis excitation and to provide excitation as well.

The upper and lower plates are separated by spacers 16, which are shown in detail in FIGS. 5, 6, and 7. Spacer 16 can be formed of hexagonal stock (shown in phantom in FIG. 6) or preferably can be formed of round stock with sides 35 being flattened so that a wrench can be fitted on the round stock. Spacer 16 comprises an enlarged central section 36 having an upper surface 38 and a lower surface 40. An upper shaft 42 extends from upper surface 38 and a lower shaft 44 extends from lower surface 40. Shafts 42 and 44 are axially aligned. Shaft 42 is threaded and is shaped so that it is threadably engaged in threaded opening 22 in the top plate 12. By applying a wrench to flat surfaces 35, the spacer can be screwed tightly into the underside of plate 12, tightly engaging the spacer to plate 12. Opening 22 desirably is one inch but could be up to one and one-half inches in diameter.

Shaft 44 fits closely into opening 17 in lower plate 14. Shaft 44 is not threaded and slides into opening 17. Desirably, the lower end 50 of shaft 44 does not extend all the way through lower plate 14 but terminates just short of the bottom surface of lower plate 14. With a half-inch lower plate, lower shaft 44 desirably is 0.485 to 0.495 inches long.

Lower shaft 44 in the preferred embodiment is 0.932 to 0.937 inches in diameter and fits in a hole that is just slightly larger (about one inch in diameter). The spacer can be formed of aluminum or steel or other metal.

An internal opening 52 three-quarters of an inch in diameter is formed axially through the shafts and central portion of the spacer and is threaded its entire length. The lower end of this opening receives the threaded end of bolt 20, which is three-quarters inch in diameter. Desirably the bolt and opening are threaded with ten threads per inch.

Bolt 20 fits through opening 34 in casing 32 and then is received in opening 52 in the spacer. When bolt 20 is tightened, lower surface 40 on the spacer is drawn tightly against the upper surface of lower plate 14, thus locking the plates together on opposite sides of the central portion 36 of the spacer. In the preferred practice of the present invention, the entire length of the spacer is 2.5 inches long and the central portion is 1.25 inches long. Different sizes of spacers may be used for different applications.

The upper end of threaded opening 52 exiting at the end 54 of shaft 42 can receive a bolt 26 for attaching the mounting fixture 28 to the top of the table. Bolt 26 preferably is short enough to enable two bolts to fit in opposite ends of the same hole 52.

Upper shaft 42 is desirably somewhat longer than the opening 22 in upper plate 12. With a one-half inch plate, shaft 42 desirably is about 7.35 to 7.50 inches long. The upper end 54 of the shaft thus extends approximately one-quarter inch above the top of the plate. An insulating layer comprising an insulating sheet 60 and a titanium sheet 61 on top of it is typically mounted on the upper surface of plate 12, with end 54 of shaft 42 extending through the insulating layer. Thus, when shaft 42 is used for mounting a mounting fixture on it, the mounting fixture can engage upper surface 54 of the shaft 42 without compressing the insulating material.

In operation, the table is mounted on springs 62 or other means for isolating the vibrating table from a frame 63. A product 30 is bolted by means of a mounting fixture 28 to the top of the table, and the pneumatic vibrators are mounted to the bottom of the table at different angles. Desirably the vibrators are operated from a common manifold. This inherently produces enough variation in the pneumatic pressure to each vibrator to cause random variation in the frequency of the vibrators. The resultant vibration realized on the upper surface of the table is randomly distributed over a frequency range that extends as low as about 60 Hz., with vibrations being uniform across the top of the table and with variations in vibration amplitude at different frequencies being within tolerable limits. Moreover, with the present invention, the vibration energy is transmitted from the vibrators to the top of the table at an efficiency that compares favorably with other products on the market. An especially important advantage of the present invention is that this table provides a lower frequency vibration than appears to be available with at least some other products.

An added advantage of the present invention is that the present table is far more inexpensive to construct than competitive tables presently on the market.

While the foregoing represents an exemplary embodiment of the present invention, it should be understood that various changes may be made in the embodiment disclosed without departing from the spirit and scope of the present invention, which is defined in the appended claims.

I claim:

1. A shaker table comprising:

an upper plate on which a test product is mounted, the upper plate having a plurality of vibrator mounting openings therein;

a lower plate spaced below the upper plate, the lower plate having a plurality of vibrator mounting openings therein that are aligned with vibrator mounting openings in the upper plate;

a plurality of spacers mounted between the plates, the spacers each having a central portion positioned between the plates, a upper shaft extending upwardly therefrom, and a lower shaft extending downwardly therefrom, the upper and lower shafts fitting respectively in the corresponding vibration mounting openings in the upper and lower plates, the central portion abutting the upper and lower plates so as to space the plates a predetermined distance apart, the shafts having concentric axial openings therein that extend into the central portion, the openings being threaded;

fastener means for securely mounting the spacers to the upper plates; and fastener means for mounting vibrators to an underside of the lower plate, said fastener means including threaded fasteners that extend through openings in the vibrators and engage the threaded internal openings in the lower shafts, the fastener means thereby serving to attach the lower plate to the spacers and the upper plate.

2. A shaker table according to claim 1 wherein the vibrators engage the lower plate and the lower shaft is shorter than the thickness of the lower plate, such that the vibrators do not engage the lower shaft when the fasteners are tightened between the vibrators and the lower shafts.

3. A shaker table according to claim 1 wherein the fastener means for securing the spacers to the upper plate comprise external threads on the upper shaft that mate with internal threads in the vibrator openings in the upper plate, such that the spacers are attached to the upper plates by threading the upper shafts into the upper plate vibrator openings.

4. A shaker table according to claim 3 wherein the central portions of the spacers include flattened sides that can be engaged by a wrench to rotate and tighten the spacers in the vibrator openings in the upper plate.

5. A shaker table according to claim 1 wherein the vibrators are skewed pneumatic vibrators operating at random frequencies and the number of vibrators, size and spacing of plates, and size, number, and spacing of spacers is such that the table provides vibrations that are generally uniform over the table top and are reasonably uniform in amplitude throughout a test frequency range.

6. A shaker table according to claim 5 wherein the table is functionally proportional to a table that is approximately forty-eight inches square, with the upper and lower plates being formed of aluminum plates approximately one-half inch thick and the spacers separating the plates by about one and one-quarter inches, with approximately sixteen spacers being mounted in a balanced pattern over the table.

7. A shaker table according to claim 1 wherein the threaded internal openings in the lower shafts extend all the way through the spacers and emerge at upper ends of the upper shafts, wherein the threaded openings serve as a means to attach test products or fixtures to the shaker table by means of threaded fasteners that are received in the threaded openings.

8. A shaker table according to claim 7 wherein the upper shafts are longer than the thickness of the upper plate, such that the upper ends extend above the upper plate when the spacers are mounted in the upper plate, the upper ends serving to position test products or fixtures a sufficient distance above the upper plate that insulation can be positioned between the upper plate and the test products or fixtures without compressing the insulation.

* * * * *